June 29, 1954   G. PIELSTICK   2,682,365
COOLING MEANS FOR ROTARY BLOWERS
Filed May 9, 1950
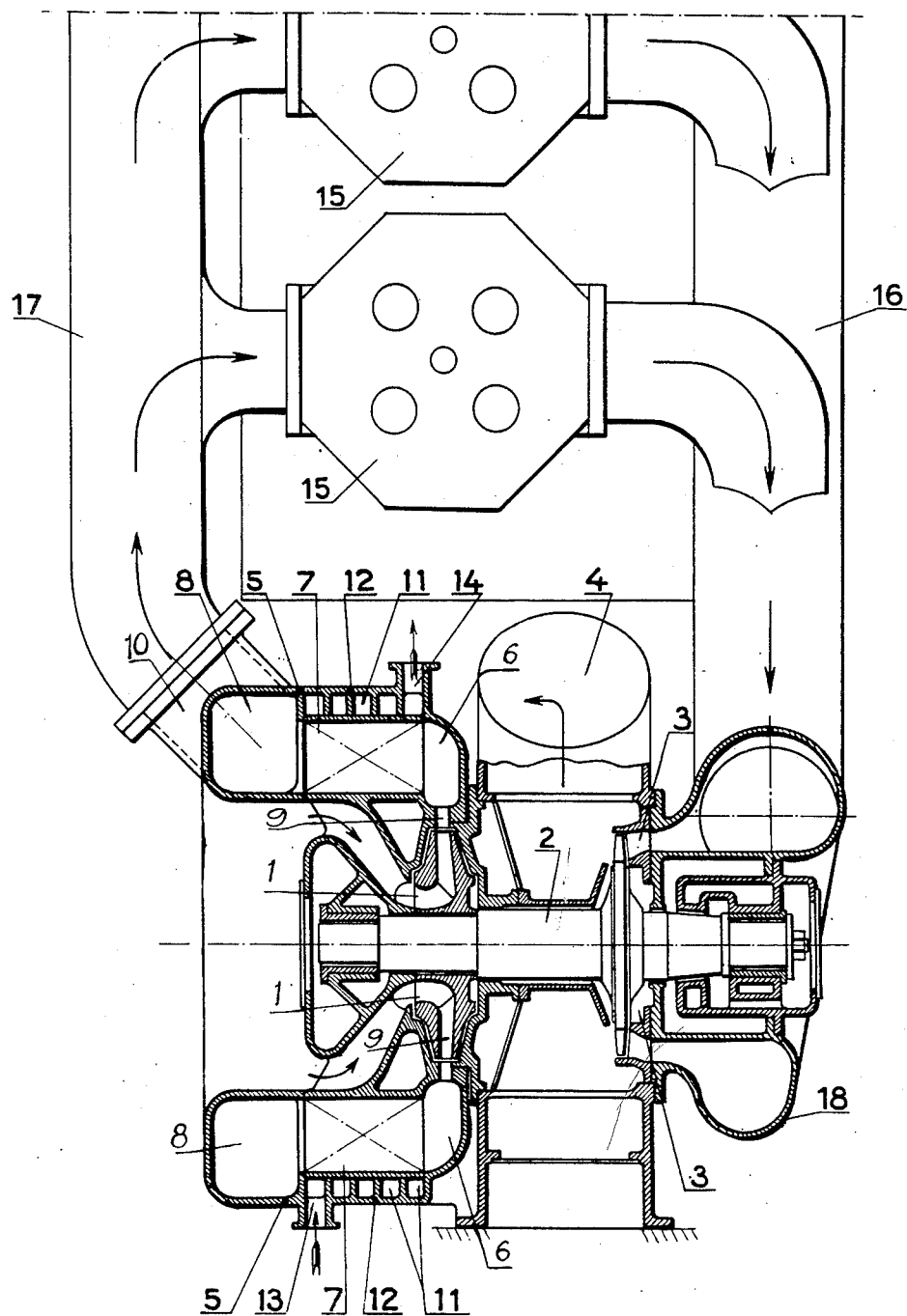

Patented June 29, 1954

2,682,365

UNITED STATES PATENT OFFICE 2,682,365

COOLING MEANS FOR ROTARY BLOWERS

Gustav Pielstick, Saint Germain en Laye, France

Application May 9, 1950, Serial No. 160,843

Claims priority, application France May 30, 1949

2 Claims. (Cl. 230—209)

This invention relates to cooling means for the air discharged from rotary blowers. It is more particularly though not exclusively concerned with such cooling means for the air delivered from a rotary blower to a combustion engine for supercharging said engine.

In many four-cycle diesel engine installations, the engine is supercharged with air delivered to it from a rotary blower. The air as discharged from the blower may be at a very high temperature, especially where the supercharging or boost pressure is high, and it is desirable to cool said air prior to its delivery into the engine, this making it possible to increase the weight of air entering the cylinders per unit time and also to reduce the temperature of the cylinder walls, thereby increasing the efficiency factor of the powerplant. For this purpose, it is customary in present practise to interpose an air-cooler at a point downstream of the blower discharge outlet.

Because of the loss of heat incurred, such an air-cooler has to be of comparatively large size, so that it may be rather difficult to install, especially if the available space is restricted, and the resulting powerplant becomes inordinately space-consuming.

It is an object of this invention to overcome this and other drawbacks, by the provision of a novel air-blower construction in which the air-cooling means for the output air is associated with the blower in an improved and more rational manner.

Essentially, a combined air-blower and cooling means according to the invention comprises an annular compressed air discharge outlet and annular coolant-circulating ducts coaxial with and surrounding said discharge outlet. Thus the compressed air is brought down to a desirably low temperature before its discharge from the blower assembly and may be directly delivered into the combustion engine that is to be supercharged without having to interpose a separate cooler unit in the circuit. The construction of the invention makes it possible to provide very large heat transmission surfaces for the withdrawal of heat from the stream of compressed air without introducing any loss of heat.

The cooling assembly including the annular discharge space and the cooling ducts surrounding said space may be provided integral with the blower, or separate from and adaptable to it. In any case, great economy in space is achieved and installation is facilitated.

One exemplary embodiment of the invention will now be described by way of illustration and not of limitation, with reference to the accompanying drawing, which illustrates in partial axial cross-section a complete combination turbine, blower and cooler unit according to the invention.

As shown, the unit comprises a blower 1 of the centrifugal type driven from a shaft 2. The shaft 2 is shown as driven by a gas-turbine wheel 3 integral with it, from which the expanded gas flows out through the exhaust stack 4. It is to be understood that other means could be provided for driving the blower 1.

Coaxial with and surrounding the blower section proper 1 is a toroidal air-outlet space generally designated 5 of generally axial extent and internally subdivided lengthwise thereof into three serially disposed annular sections or compartments 6, 7 and 8. The first or upstream section 6 is directly supplied from the discharge outlet 9 of the blower. The intermediate section 7 constitutes the cooling space proper, while the downstream section 8 is a discharge manifold and is adapted to be connected at 10 with the air-induction manifold of the combustion engine (not shown).

Surrounding the intermediate, cooling section 7 is an annular water-jacket 12 comprising annular ducts 11 for a coolant such as water, shown as entering into the water jacket at 13 and issuing therefrom at 14.

It will be obvious that air-cooling means are thus provided which is adapted to form, together with the blower with which it is used, a compact and thermally efficient unit.

The drawing shows in a diagrammatic way the engine on which the blower is mounted. The cylinders of the engine have been shown at 15, the inlet pipe at 17 and the exhaust pipe at 16 connected to the turbine 18. It is apparent that the manifold 10 is directly connected with the inlet pipe 17 of the engine.

Many modifications may naturally be made in the construction described and illustrated without exceeding the scope of invention. Thus the toroidal space 5 may be provided with a different sectional contour than that shown. Furthermore, while the invention was more particularly described with reference to an air-blower for use in supercharging a diesel engine, it is to be understood that it is applicable to a blower or compressor serving a different purpose.

What I claim is:

1. In a blower assembly adapted for use for supercharging internal combustion engines and like purposes, a blower casing, a substantially axial inlet in said casing for the air to be compressed, a radial annular outlet for the air after it has been compressed, a continuous annular enclosure coaxially and entirely surrounding said casing, together with said air inlet, and extending in the direction from said air outlet towards said air inlet, in said casing, said enclosure having its upstream end connected with said outlet, and being intended for the flow of the compressed air towards the engine in counter-current with regard to the flow of air in the blower casing, a manifold on said enclosure for the connection thereof with the engine, continuous annular cooling jacket means surrounding said enclosure and extending at least over the central part thereof for abstracting heat from the gas only when it flows through said enclosure towards the engine, and controlling means actuating said blower and situated coaxially with respect to the said latter.

2. A blower assembly as in claim 1, wherein said annular enclosure consists substantially of three aligned and freely communicating annular parts, the first one being directly connected with the said outlet, the second, which is the most important, being surrounded by the said cooling jacket and the third being provided with the said manifold.

References Cited in the file of this patent

UNITED STATES PATENTS

| Number | Name | Date |
| --- | --- | --- |
| 1,038,200 | Rateau | Sept. 10, 1912 |
| 2,159,422 | Buchi | May 23, 1939 |

FOREIGN PATENTS

| Number | Country | Date |
| --- | --- | --- |
| 225,027 | Switzerland | Apr. 16, 1943 |
| 408,749 | France | Apr. 4, 1910 |